3,192,217
PREPARATION OF AMINE-BORANES
Mervin D. Marshall, Fombell, Pa., assignor to Callery Chemical Company, Pittsburgh, Pa., a corporation of Pennsylvania
No Drawing. Filed Mar. 7, 1960, Ser. No. 12,972
6 Claims. (Cl. 260—290)

This invention relates to a new method of preparing amine-boranes whereby amine-boranes are produced from the reaction of an amine with a dialkoxyborane.

The amine-boranes are adducts of an amine with the borane, $BH_3$, group; they correspond to the general formula $X:BH_3$ where X is an amine. A number of amine-boranes are known and have found substantial use as organic reducing agents, hydrocarbon fuel additives and chemical intermediates. They have heretofore generally been prepared by the reaction of the amine with diborane, $B_2H_6$, according to the equation $$2X + B_2H_6 = 2X:BH_3$$

Diborane, however, is expensive to make and store and its use requires special techniques and equipment, so that the use of that process necessitates a relatively high price for the produced amine-boranes.

The dialkoxyboranes are compounds having the formula $HB(OR)_2$, where R is an alkyl radical. They are cheaper to make than diborane and can be stored and used in conventional chemical processing equipment. I have discovered, and it is this discovery upon which the present invention is in large part predicated, that dialkoxyboranes and amines do not form the usual type of adducts which are expected from amines and boranes, but that they react to form amine-boranes according to the equation $$3HB(OR)_2 + X \rightarrow X:BH_3 + B(OR)_3$$

where X is an amine and R is a alkyl radical. The occurrence of this reaction is contrary to that expected as predicted from the Lewis acid-base theory and from similar reactions of amines with other boron compounds. In such cases the amine, a Lewis base, and the boron compound, a Lewis acid, simply combine to form an addition compound or adduct. For example, $BF_3$ and trimethylamine form an addition compound $(CH_3)_3N:BF_3$; diborane (which reacts as two $BH_3$ groups) and pyridine form pyridine-borane, $C_5H_5N:BH_3$; and trimethyl borate, $B(OR)_3$, and ammonia form $NH_3:B(OR)_3$. Thus, the expected product of the reaction of an amine with a dialkoxyborane would be a simple adduct, $X:BH(OR)_2$. In fact, however, amine-boranes are produced, thereby providing an unexpected and less expensive route to these important compounds.

Any of the amine-boranes may be produced by my method. Thus, any amine which forms an amine-borane may be used in carrying out my invention. For example, suitable amine reactants include primary amines, such as methylamine, ethylamine, butylamine, and allylamine; secondary amines such as dimethylamine, diethylamine, dipropylamine and diamylamine; tertiary amines, such as trimethylamine, triethylamine, tripropylamine, tributylamine, trioctylamine and tridecylamine; cylic amines, such as pyridine, pyrollidine and lutidine; aromatic amines, such as aniline and toluidine; mixed amines, such as dimethyldodecylamine and methyldioctadecylamine; and diamines, such as triethylene diamine. Tertiary amines form quite stable amine-boranes, and produce good yields, so that such amines are usually preferred. Secondary amines are generally satisfactory, except that the amine-boranes may decompose at elevated temperatures. Amine-boranes made from primary amines are sometimes unstable except at low temperatures, and side reactions often reduce the yields obtained, so that primary amines are not usually used unless their particular properties are desired.

The reaction to produce the amine-boranes proceeds readily when the reactants are contacted, without the need for any particularized conditions of reaction. However, because dialkoxyboranes may tend to disproportionate at ambient temperatures, it is generally preferred to use a dialkoxyborane admixed with a trialkylborate. Thus, for example, a mixture of trimethylborate and dimethoxyborane containing less than about 25 wt. percent dimethoxyborane is relatively stable at ordinary ambient temperatures and is conveniently used as a dimethoxyborane source. Another reason for using a solution of the dialkoxyborane in a trialkylborate, is that my preferred methods of preparing dialkoxyboranes produce mixtures of dialkoxyboranes in trialkylborates, and such mixtures can be used without further separation to produce amine-boranes in accordance with the method of this invention.

The temperature used to carry out the reaction is not of critical import, so that generally room temperature, i.e. about 20° to 30° C., is used. Sometimes, as when the process is practiced using a pure or nearly pure dialkoxyborane having a tendency to volatilize or otherwise dissipate, the reactants are mixed initially at a temperature below room temperature and then allowed to warm gradually; temperatures as low as −80° C. can be used for this purpose. Moderate heating can also be employed, although with certain amine-boranes, e.g., primary amine-boranes, such temperatures may result in some decomposition.

The preferred dialkoxyborane reactant is dimethoxyborane, chiefly because it is the most available and least expensive. It may be noted that the identity of the product does not depend upon the particular dialkoxyborane used; for example, trimethylamine-borane, $(CH_3)_3N:BH_3$, is produced from trimethylamine, regardless of which dialkoxyborane is used as the dialkoxyborane reactant. For this reason, dialkoxyborane other than dimethoxyborane are rarely used at present, although other dialkoxyboranes, such as diethoxyborane, diisopropoxyborane and dibutoxyborane, can be used if desired.

The dialkoxyboranes tend to hydrolyze with water and oxidize in air, so that yields are drastically reduced unless the process is conducted in the absence of moisture and oxygen. This may be accomplished by the use of an inert, non-oxidizing cover gas, such as nitrogen, argon or hydrogen, or by performing the reaction under a vacuum.

In one demonstration, described here as illustrative of the practice of my invention, 1500 milliliters of a methyl borate solution containing 10.45 wt. percent dimethoxyborane was cooled to −7° C. To this solution, 39.4 grams of pyridine were added and the mixture was warmed to room temperature. After about six hours some yellow by-product solids had precipitated. The reaction mixture was agitated for an additional sixty-four hours at room temperature, filtered to remove the by-product solids, and the filtrate was vacuum distilled to remove the methyl borate. The liquid residue was substantially pure pyridine-borane.

In another demonstration 940 millimoles of dimethoxyborane admixed with trimethylborate were charged into an evacuated three-necked flask fitted with dropping funnels and a magnetically actuated agitator. The solution was cooled and 319 millimoles of allkylamine were added with stirring. The solution was then warmed to room temperature and maintained at room temperature for several hours. Volatile materials were evaporated from the mixture, leaving a clear viscous residue. This residue was substantially pure allkylamine-borane, containing only a minor amount of methoxyl impurities.

In still other examples, the process was shown to be applicable to amines and dialkoxyboranes generally, and, except as described above, variations in the reaction conditions were found to have no deleterious effect.

According to the provisions of the patent statutes, I have explained the principle and mode of practicing my invention, and have described what I now consider to be its best embodiments. However, I desire to have it understood that, within the scope of the appended claims, the invention may be practiced otherwise than as specifically described.

I claim:
1. A method of producing an amine-borane, $X:BH_3$ where X is an amine, which comprises reacting an amine, X, consisting solely of carbon, hydrogen, and amine nitrogen with a dialkoxyborane, $HB(OR)_2$ where R is a monovalent lower-alkyl radical, and recovering the amine-borane thus formed.
2. A method in accordance with claim 1 in which the dialkoxyborane is admixed with a trilower-alkylborate.
3. A method in accordance with claim 1 in which the dialkoxyborane is dimethoxyborane, $HB(OCH_3)_2$.
4. A method of producing dimethylamine-borane which comprises reacting dimethylamine with a solution of dimethoxyborane in trimethylborate and recovering the dimethylamine-borane thus formed.
5. A method of producing trimethylamine-borane which comprises reacting trimethylamine with a solution of dimethoxyborane in trimethylborate and recovering the trimethylamine-borane thus formed.
6. A method of producing pyridine-borane which comprises reacting pyridine with a solution of dimethoxyborane in trimethylborate and recovering the pyridine-borane thus formed.

References Cited by the Examiner
UNITED STATES PATENTS

| | | | |
|---|---|---|---|
| 2,671,107 | 3/54 | Beckberger | 260—699 |
| 2,844,583 | 7/58 | Schnizer | 260—699 |

OTHER REFERENCES

Mikhailov et al.: Chem. Abstracts, vol. 52, col. 19916 (1958).

IRVING MARCUS, *Primary Examiner.*

UNITED STATES PATENT OFFICE
CERTIFICATE OF CORRECTION

Patent No. 3,192,217

June 29, 1965

Mervin D. Marshall

It is hereby certified that error appears in the above numbered patent requiring correction and that the said Letters Patent should read as corrected below.

Column 2, line 65, for "allkylamine" read -- allylamine --; line 70, for "allkylamine-borane" read -- allylamine-borane --.

Signed and sealed this 26th day of April 1966.

(SEAL)
Attest:

ERNEST W. SWIDER
Attesting Officer

EDWARD J. BRENNER
Commissioner of Patents